(12) United States Patent
Ellis-Monaghan et al.

(10) Patent No.: US 9,640,988 B2
(45) Date of Patent: May 2, 2017

(54) COMPARATIVE ESD POWER CLAMP

(71) Applicant: INTERNATIONAL BUSINESS MACHINES CORPORATION, Armonk, NY (US)

(72) Inventors: John J. Ellis-Monaghan, Grand Isle, VT (US); Alain Loiseau, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 210 days.

(21) Appl. No.: 14/569,005

(22) Filed: Dec. 12, 2014

(65) Prior Publication Data
US 2016/0172850 A1 Jun. 16, 2016

(51) Int. Cl.
*H02H 9/00* (2006.01)
*H02H 9/04* (2006.01)

(52) U.S. Cl.
CPC .................. *H02H 9/046* (2013.01)

(58) Field of Classification Search
CPC ..................................... H02H 9/046
USPC ............................................. 361/56
See application file for complete search history.

(56) References Cited

U.S. PATENT DOCUMENTS

| | | | |
|---|---|---|---|
| 6,788,506 B1 * | 9/2004 | Stockstad | H03K 5/08 361/56 |
| 7,405,914 B2 | 7/2008 | Reynders et al. | |
| 7,660,086 B2 | 2/2010 | Rodgers et al. | |
| 7,667,936 B2 | 2/2010 | Ker et al. | |
| 8,456,784 B2 | 6/2013 | Stockinger et al. | |
| 8,564,917 B2 | 10/2013 | Chen et al. | |
| 8,693,149 B2 | 4/2014 | Ball et al. | |
| 8,730,624 B2 | 5/2014 | Chang et al. | |
| 8,730,626 B2 | 5/2014 | Tseng et al. | |
| 8,760,827 B2 | 6/2014 | Campi, Jr. et al. | |
| 2011/0261489 A1 | 10/2011 | Zupcau | |
| 2012/0250195 A1 | 10/2012 | Chang et al. | |
| 2013/0215541 A1 | 8/2013 | Karp | |

FOREIGN PATENT DOCUMENTS

WO 2011139459 A2 11/2011

* cited by examiner

*Primary Examiner* — Stephen W Jackson
(74) *Attorney, Agent, or Firm* — Anthony Canale; Andrew M. Calderon; Roberts Mlotkowski Safran Cole & Calderon, P.C.

(57) ABSTRACT

Approaches for a comparative ESD protection scheme are provided. An electrostatic discharge (ESD) clamping circuit includes: a discharge field effect transistor (FET) connected between a power supply node and ground; and a comparator that receives a divided power supply voltage at a first input and a reference voltage at a second input. The comparator outputs a first value that turns the discharge FET on when the divided power supply voltage is greater than the reference voltage. The comparator outputs a second value that turns the discharge FET off when the divided power supply voltage is less than or equal to the reference voltage.

20 Claims, 4 Drawing Sheets

COMPARATIVE ESD POWER CLAMP

FIELD OF THE INVENTION

The invention relates to semiconductor structures and methods of forming the same and, more particularly, to electrostatic discharge protection in integrated circuits.

BACKGROUND

Electrostatic discharge (ESD) is a momentary and sudden electric current that flows when an excess of electric charge stored on an electrically insulated structure finds a path to another structure at a different electrical potential, such as ground. The ESD protection scheme, its power consumption and efficient use of semiconductor real estate to protect integrated circuits (ICs) are particularly serious concerns with microelectronic devices. In most cases, the ICs in these devices are not repairable if affected by an ESD event. The shrinking size of modern electronics demands that ICs, complete with ESD protection, fit into a small package.

It is common in IC design to include ESD protection, in the form of a "clamping" circuit, to the terminals that receive an operating voltage for driving an IC chip, or portion thereof. A voltage clamp ensures that a sudden surge in voltage from an ESD event can be safely discharged so that no damage results to the internal active devices of the integrated circuit. The clamping circuit often includes a relatively large field-effect transistor (FET) capable of discharging the electrical current produced from an ESD event that, however brief, can result in peak voltages many times the operating voltage of the IC. When an ESD potential occurs across the power supply and ground terminals, a trigger circuit turns on the FET so as to conduct the ESD current, thereby clamping the power supply terminal voltage.

High voltage ESD clamps can be triggered based on either a rate of change of voltage (dv/dt) or an absolute value of the voltage, e.g., at a power supply terminal. Each of these types of trigger circuits has disadvantages. For example, trigger circuits that are based on the absolute value of a voltage require an element, such as a zener diode, that triggers the clamping circuit at the correct voltage. The trigger voltage must be greater than the normal operating voltage (Vdd) of the power supply but less than the breakdown voltage (Vbd) of devices connected to the power supply terminal. An ESD clamp of this type waits until the absolute value of the voltage on the power supply terminal exceeds the trigger voltage before triggering, which leaves little time and a small voltage window to operate (i.e., clamp the excessive voltage) before damaging the devices connected to the power supply. Further exasperating this configuration is the fact that high voltage applications typically include many different operational voltages (e.g., 5, 7, 12, 25, 50, and 120 V), meaning that plural trigger circuits must be tailored to each operational voltage.

Trigger circuits that are based on rate of change of voltage at the power supply terminal typically include a resistor-capacitor (RC) circuit having a time constant sufficient to keep the clamp device triggered for the duration of an ESD event. However, in some applications the normal operational rise time approaches the time constant defined by the RC-triggered circuit, which causes the trigger circuit to undesirably turn on the clamping circuit during a normal power up sequence.

SUMMARY

In a first aspect of the invention, there is an electrostatic discharge (ESD) clamping circuit including: a discharge field effect transistor (FET) connected between a power supply node and ground; and a comparator that receives a divided power supply voltage at a first input and a reference voltage at a second input. The comparator outputs a first value that turns the discharge FET on when the divided power supply voltage is greater than the reference voltage. The comparator outputs a second value that turns the discharge FET off when the divided power supply voltage is less than or equal to the reference voltage.

In another aspect of the invention, there is an electrostatic discharge (ESD) protection device. The device includes a clamp circuit that compares a divided power supply voltage to a reference voltage and, based on the comparing, performs one of: turns on an ESD discharge field effect transistor (FET) when the divided power supply voltage is greater than the reference voltage, and turns off the ESD discharge FET when the divided power supply voltage is less than or equal to the reference voltage.

In another aspect of the invention, there is a method of providing electrostatic discharge (ESD) protection. The method includes generating a divided power supply voltage from a voltage on a power supply node. The method also includes comparing the divided power supply voltage to a reference voltage. The method additionally includes, based on the comparing, performing one of: turning on an ESD discharge field effect transistor (FET) when the divided power supply voltage is greater than the reference voltage, and turning off the ESD discharge FET when the divided power supply voltage is less than or equal to the reference voltage.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and methods of forming the same and, more particularly, to electrostatic discharge protection in integrated circuits. As described herein, aspects of the invention provide an ESD clamping circuit that operates based on a comparison of a power supply voltage (e.g., VddHigh) to a reference power supply voltage (e.g., VddRef). In embodiments, the power supply voltage is divided (e.g., using a voltage divider) prior to the comparing to produce a divided power supply voltage, and the reference power supply voltage is filtered prior to the comparing to produce a filtered reference voltage. In this manner, the comparing comprises comparing the divided power supply voltage to the filtered reference voltage. In embodiments, the filtered reference voltage is obtained using an RC filter. In some embodiments, the comparing is performed using a PFET. In accordance with aspects described herein, the resistances and capacitances of the voltage divider are adjusted to tune the divided power supply voltage relative to the filtered reference voltage. In this manner, implementations of the invention provide a comparative ESD power supply clamp that can be used with any power supply voltage by appropriately selecting the resistances and capacitances of the voltage divider to tune the divided power supply voltage relative to the filtered reference voltage. Accordingly, the comparative ESD power supply clamp can be used with any power supply and without having to custom build a trigger circuit.

The circuits of the present invention can be implemented in semiconductor structures, which can be manufactured in a number of ways using a number of different tools. In general, though, the methodologies and tools are used to form the semiconductor implementations with dimensions in the micrometer and nanometer scale. The methodologies, i.e., technologies, employed to manufacture the semiconductor implementations have been adopted from integrated circuit (IC) technology. For example, the semiconductor implementations are built on wafers and are realized in films of material patterned by photolithographic processes on the top of a wafer. In particular, the fabrication of the semiconductor implementations uses three basic building blocks: (i) deposition of thin films of material on a substrate, (ii) applying a patterned mask on top of the films by photolithographic imaging, and (iii) etching the films selectively to the mask.

Figure 1:
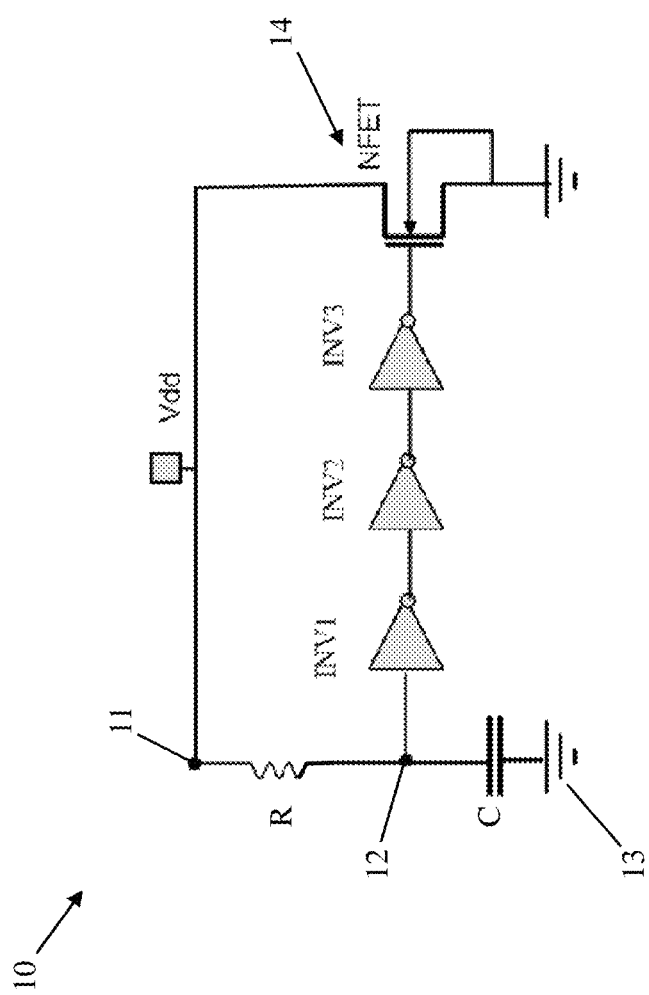
FIG. 1 shows an RC-triggered ESD clamp.

FIG. 1 shows an RC-triggered ESD clamping circuit 10. The circuit 10 includes a resistor R coupled between a first node 11 and a second node 12, and a capacitor C coupled between the second node 12 and a third node 13. The first node 11 may correspond to a power supply terminal that has a designed-for operational voltage, such as Vdd, and the third node 13 may be coupled to a ground terminal. The circuit 10 also includes a discharge FET 14 coupled between the first node 11 and the third node 13. A string of inverters INV1, INV2, INV3 is coupled between the second node 12 and a gate of the FET 14. In a typical configuration, the FET 14 is an n-type FET (NFET) and there is an odd number of inverters. The circuit distinguishes normal operation from an ESD event based on the supply (voltage) rise time at the first node 11. Specifically, the resistance of the resistor R and the capacitance of the capacitor C define an RC constant. When the rise time of a voltage on the first node 11 is greater than the RC constant, e.g., during normal operation, the FET 14 remains off and the first node 11 is not clamped to the third node 13. On the other hand, when the rise time of a voltage on the first node 11 is less than the RC constant, e.g., during an unpowered ESD event, the circuit 10 turns on the FET 14, which clamps the first node to the third node, i.e., shunts the first node 11 to ground. The FET 14 in FIG. 1 is an NFET; however, a p-type FET (PFET) may be used as the FET 14 with an even number of inverters, e.g., by eliminating INV3.

Still referring to FIG. 1, an ESD event rise time is normally less than or equal to 10 nanoseconds, and a design/operational supply rise time (defined in a device specification) is recommended to be equal to or greater than 100 microseconds. This gives a circuit designer sufficient range to design the resistor R and the capacitor C such that the RC constant is between the ESD rise time and the design/operational supply rise time. For example, RC-trigger circuits are commonly designed with an RC constant of 1 microsecond. However, some high voltage designs have extremely fast supply rise times that are on the order of tens of nanoseconds, which is less than a typical RC constant and thus can cause the circuit 10 to turn on the FET 14 during normal operation.

Figure 2:
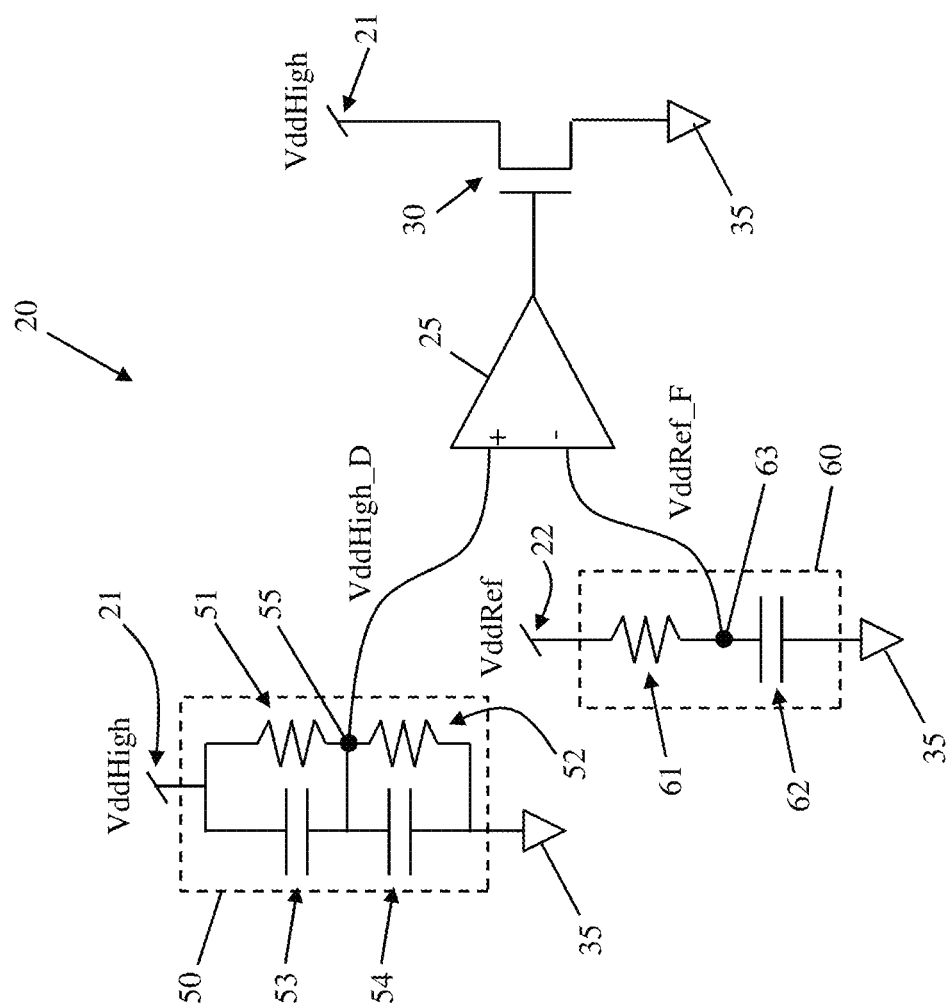
FIGS. 2-4 comparative ESD power clamps in accordance with aspects of the invention.

FIG. 2 shows an ESD clamping circuit 20 in accordance with aspects of the invention. The circuit 20 includes a first power supply voltage VddHigh provided at a first node 21 and a second power supply voltage VddRef provided at a second node 22. The first node may be a power supply terminal (e.g., a power supply rail). The circuit 20 includes a comparator 25 that compares a divided value of the voltage on the first node 21 to a filtered value of the voltage on the second node 22. The divided voltage is referred to as VddHigh_D and the filtered voltage is referred to as VddRef_F. An output of the comparator 25 is coupled to a gate of a discharge NFET 30, such that the comparator 25 can turn the NFET 30 on and off. The drain of the NFET 30 is coupled to the first node 21 and the source of the NFET 30 is coupled to ground 35.

The circuit 20 is configured such that during normal operation, VddHigh_D (the divided voltage) is less than or equal to VddRef_F and thus causes the comparator 25 to output a value that turns the NFET 30 off. The circuit 20 is further configured that during an unpowered ESD event on the first node 21, VddHigh_D is greater than VddRef_F and thus causes the comparator 25 to output a value that turns the NFET 30 on and shunts the first node 21 to ground 35. In this manner, the circuit 20 provides a comparative ESD power clamp. A PFET may be used in the place of the NFET 30 by connecting an odd number of inverters to the output of the comparator 25.

According to aspects of the invention, VddHigh_D (the divided voltage) is obtained using a voltage divider 50 coupled to the first node 21. The voltage divider 50 may include any suitable circuit that functions to generate a divided value of the voltage on the first node 21. As but one example, the voltage divider 50 may include a first resistor 51 having resistance R1, a second resistor 52 having resistance R2, a first capacitor 53 having capacitance C1, and a second capacitor 53 having capacitance C2 arranged between the first node 21 and ground 35 as depicted in FIG. 2. In this manner, the divided voltage VddHigh_D is output at node 55 and equals the voltage on the first node 21 times R2/(R1+R2). The series resistors achieve the DC voltage division, while the series capacitors achieve the AC voltage division. In embodiments, the resistors and the capacitors of the voltage divider are chosen so that R1/R2=C2/C1 so that both R and C derive the same VddHigh_D.

Still referring to FIG. 2, VddRef_F is obtained using a filter circuit 60 coupled to the second node 22. The filter circuit 60 may include any suitable circuit that functions to filter the voltage on the second node 22. As but one example, the filter circuit 60 includes a resistor 61 and a capacitor 62 connected in series between the second node 22 and ground 35, with VddRef_F being output at a node 63 between the resistor 61 and the capacitor 62.

In an illustrative example, VddHigh is designed to have a nominal value ranging from 0 V (when unpowered) to 9 V (during normal operation). In this example, R1=R2 and C1=C2 such that VddHigh_D equals one half of VddHigh. In this example, VddRef is designed to have a value ranging from 0 V (when unpowered) to 5 V (during normal operation). In this manner, during normal operation, VddHigh=9 V, VddHigh_D=5 V, and VddRef=5 V. Since VddHigh_D is less than or equal to VddRef (e.g., both are 5 V), the comparator 25 outputs a value that turns off the NFET 30 and keeps the first node 21 isolated from ground 35. During an unpowered ESD event, there is an ESD voltage pulse on the first node 21 that causes VddHigh_D to be greater than zero while VddRef is at zero (since it is unpowered). As such, with VddHigh_D being greater than VddRef during the ESD event, the comparator 25 outputs a value that turns the NFET 30 on and shunts the first node 21 to ground 35 to discharge the ESD pulse. The invention is not limited to these voltages, and any suitable voltages may be used for VddHigh and VddRef. Moreover, the values of R1, R2, C1, C2 may be adjusted to match the desired voltages of VddHigh and VddRef, e.g., to tune VddHigh_D such that VddHigh_D is less than or equal to VddRef during normal operation.

In accordance with aspects of the invention, the filter circuit 60 functions to decouple VddRef_F from an ESD event at the second node 22. For example, a same ESD pulse may occur on both the first node 21 and the second node 22. Due to the fast rise time and short duration of the ESD pulse, the charging of the capacitor 62 of the filter circuit 60 maintains VddRef_F at or very near 0 V while VddHigh_D rises to a much higher value. In this manner, the filter circuit 60 is used to ensure proper ESD protection for the first node 21 even when the ESD pulse is also present at the second node 22.

In embodiments, VddHigh is an operational power supply voltage that is used to power devices in the integrated circuit (e.g., designed-for operational Vdd), and VddRef is a reference voltage. As such, the first node 21 may be a power supply terminal (e.g., a rail) to which other devices of the chip are connected such that these devices are powered by VddHigh during normal operation of the chip. VddHigh and VddRef may be provided by separate respective powers supplies. Alternatively, VddHigh may be generated from a same power supply as VddRef using one or more charge pumps.

The comparator (e.g., comparator 25) and the discharge FET (e.g., NFET 30) may be any suitable arrangement of circuit elements that combine to function in the manner described herein. For example, FIG. 3 shows an implementation of an ESD clamping circuit 300 that utilizes a first PFET as the comparator and a second PFET as the discharge FET, with an NFET arranged as an inverter between the two PFETs.

Figure 3:
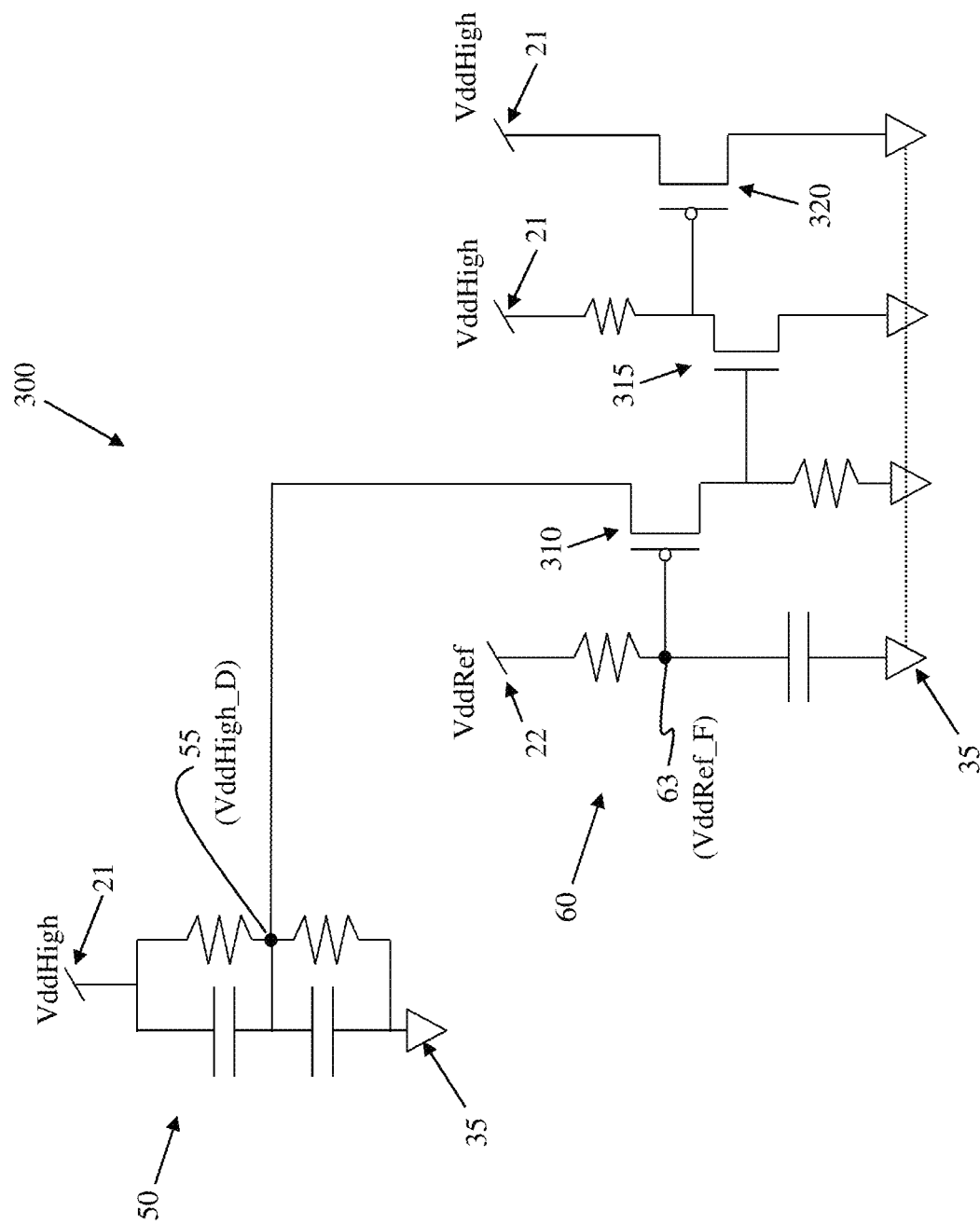

Specifically, FIG. 3 shows the circuit 300 comprising the first node 21, second node 22, ground 35, voltage divider 50, and filter circuit 60 similar to the circuit 20 of FIG. 2. Node 55 of the voltage divider 50 is connected to the source of a PFET 310. Node 63 of the filter circuit 60 is connected to the gate of the PFET 310. The drain of the PFET 310 is connected to ground 35 by a resistor. The PFET 310 connected in this manner functions as a comparator since it turns on when VddHigh_D (the divided voltage) is greater than the sum of VddRef_F (the filtered reference voltage) and the threshold voltage of the PFET 310, and turns off when VddHigh_D is less than or equal to the sum of VddRef_F and the threshold voltage of the PFET 310.

Still referring to FIG. 3, the drain of the PFET 310 is connected to the gate of an NFET 315. The source of the NFET 315 is connected to ground 35, and the drain of the NFET 315 is connected to the first node 21 via a resistor. The NFET 315 connected in this manner functions as an inverter. The drain of the NFET 315 is connected to the gate of a discharge PFET 320. The source of the PFET 320 is connected to the first node 21 and the drain of the PFET 320 is connected to ground.

With continued reference to FIG. 3, the circuit 300 is configured such that during normal operation VddHigh_D is less than or equal to VddRef_F. These respective voltages turn the PFET 310 off, which ultimately causes the PFET 320 to also be off. On the other hand, during an ESD event, VddHigh_D is greater than VddRef_F. When VddHigh_D exceeds VddRef_F by an amount at least equal to the threshold voltage (Vt) of the PFET 310, this turns the PFET 310 on which ultimately turns on the PFET 320, which shunts the first node 21 to ground 35. In this manner, the circuit 300 provides ESD protection for the first node 21.

Figure 4:
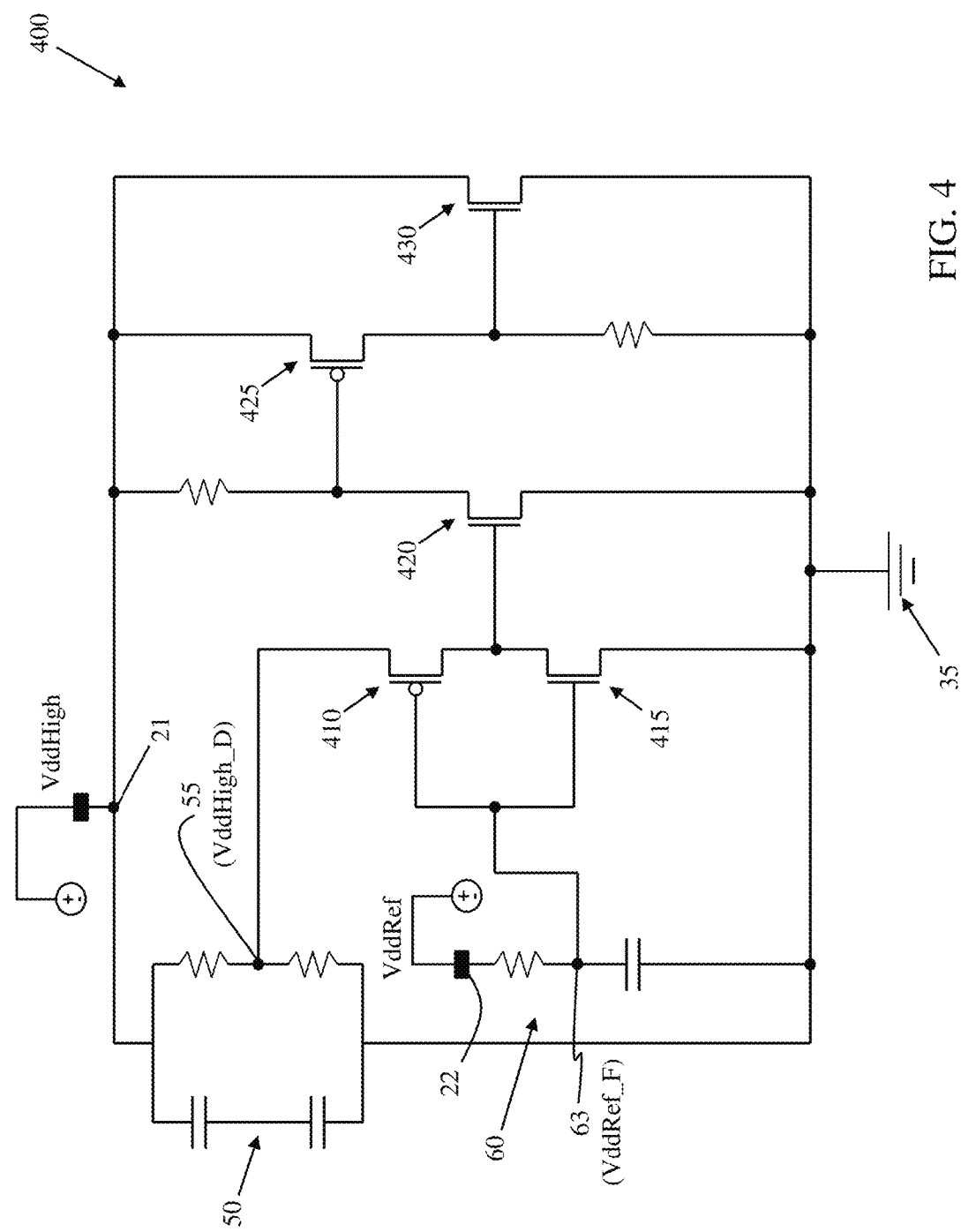

FIG. 4 shows another implementation of an ESD clamping circuit 400 in accordance with aspects of the invention. Specifically, FIG. 4 shows the circuit 400 comprising the first node 21 connected to a power supply, the second node 22 connected to a power supply, ground 35, voltage divider 50, and filter circuit 60 similar to the circuit 20 of FIG. 2. Node 55 of the voltage divider 50 is connected to the source of a PFET 410. Node 63 of the filter circuit 60 is connected to the gate of the PFET 310 and to the gate of an NFET 415. The drain of the NFET 415 is tied to a drain of the PFET 310, and the source of the NFET 415 is connected to ground 35.

Still referring to FIG. 4, the coupled drains of the PFET 410 and the NFET 415 are connected to the gate of an NFET 420. The source of the NFET 420 is coupled to ground, and the drain of the NFET 420 is coupled to the first node 21 via a resistor. The drain of the NFET 420 is also connected to the gate of a PFET 425. The source of the PFET 425 is connected to the first node 21, and the drain of the PFET 425 is connected to ground 35 via a resistor. The drain of the PFET 425 is also coupled to the gate of the discharge NFET 430. The drain of the NFET 430 is connected to the first node 21 and the source of the NFET 430 is connected to ground, such that the NFET 430 shunts the first node 21 to ground 35 when the NFET 430 is turned on.

With continued reference to FIG. 4, the PFET 410 and NFET 415 function as a comparator that compares VddHigh_D to VddRef_F. The NFET 430 functions as the discharge FET. The NFET 420 and PFET 425 function as first and second inverters connected between the comparator and the discharge FET. In this manner, the circuit is configured to turn the NFET 430 off during normal operation when VddHigh_D is less than or equal to VddRef_F+Vt, and to turn the NFET 430 on during an ESD event when VddHigh_D is greater than VddRef_F+Vt.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electrostatic discharge (ESD) clamping circuit, comprising:

a discharge field effect transistor (FET) connected between a power supply node and ground; and
a comparator that receives a divided power supply voltage at a first input and a reference voltage at a second input, wherein:
the comparator outputs a first value that turns the discharge FET on when the divided power supply voltage is greater than the reference voltage, and
the comparator outputs a second value that turns the discharge FET off when the divided power supply voltage is less than or equal to the reference voltage.

2. The circuit of claim 1, further comprising a voltage divider connected to the power supply node.

3. The circuit of claim 2, wherein an output of the voltage divider is connected to the first input of the comparator.

4. The circuit of claim 2, wherein the voltage divider is configured such that the divided power supply voltage is less than or equal to the reference voltage when a designed-for operational voltage is applied to the power supply node.

5. The circuit of claim 1, further comprising a filter connected to a reference node.

6. The circuit of claim 5, wherein an output of the filter is connected to the second input of the comparator.

7. The circuit of claim 6, wherein:
the filter comprises a resistor and a capacitor connected in series between the reference node and ground; and
the output of the filter is a node between the resistor and the capacitor.

8. The circuit of claim 1, wherein the comparator comprises a p-type field effect transistor (PFET).

9. The circuit of claim 8, wherein:
the first input of the comparator is a source of the PFET; and
the second input of the comparator is a gate of the PFET.

10. The circuit of claim 9, wherein a drain of the PFET is connected directly or indirectly to a gate of the discharge FET.

11. An electrostatic discharge (ESD) protection device, comprising:
a clamp circuit that compares a divided power supply voltage to a reference voltage and, based on the comparing, performs one of:
turns on an ESD discharge field effect transistor (FET) when the divided power supply voltage is greater than the reference voltage, and
turns off the ESD discharge FET when the divided power supply voltage is less than or equal to the reference voltage.

12. The device of claim 11, wherein the clamp circuit comprises a comparator that receives the divided power supply voltage at a first input and the reference voltage at a second input.

13. The device of claim 12, wherein:
the reference voltage is filtered by a filter connected between a reference node and the comparator;
the clamp circuit comprises a voltage divider connected to a power supply node;
an output of the voltage divider is connected to the first input of the comparator; and
the ESD discharge FET is connected between the power supply node and ground.

14. The device of claim 13, wherein the voltage divider is configured such that the divided power supply voltage is less than or equal to the reference voltage when a designed-for operational voltage is applied to the power supply node.

15. A method of providing electrostatic discharge (ESD) protection, the method comprising:
generating a divided power supply voltage from a voltage on a power supply node;
comparing the divided power supply voltage to a reference voltage; and
based on the comparing, performing one of:
turning on an ESD discharge field effect transistor (FET) when the divided power supply voltage is greater than the reference voltage, and
turning off the ESD discharge FET when the divided power supply voltage is less than or equal to the reference voltage.

16. The method of claim 15, further comprising filtering the reference voltage prior to the comparing, such that the comparing comprises comparing the divided power supply voltage to the filtered reference voltage.

17. The method of claim 16, wherein the filtering comprises filtering with an RC filter.

18. The method of claim 15, wherein the turning on the ESD discharge FET shunts the power supply node to ground.

19. The method of claim 15, wherein the generating the divided power supply voltage is performed using a voltage divider connected between the power supply node and a comparator.

20. The method of claim 19, wherein the voltage divider is configured such that the divided power supply voltage is less than or equal to the reference voltage when a designed-for operational voltage is applied to the power supply node.

* * * * *